April 3, 1934.   H. J. RENKEN   1,953,132
POWER TRANSMISSION APPARATUS
Filed Jan. 20, 1932   2 Sheets-Sheet 2
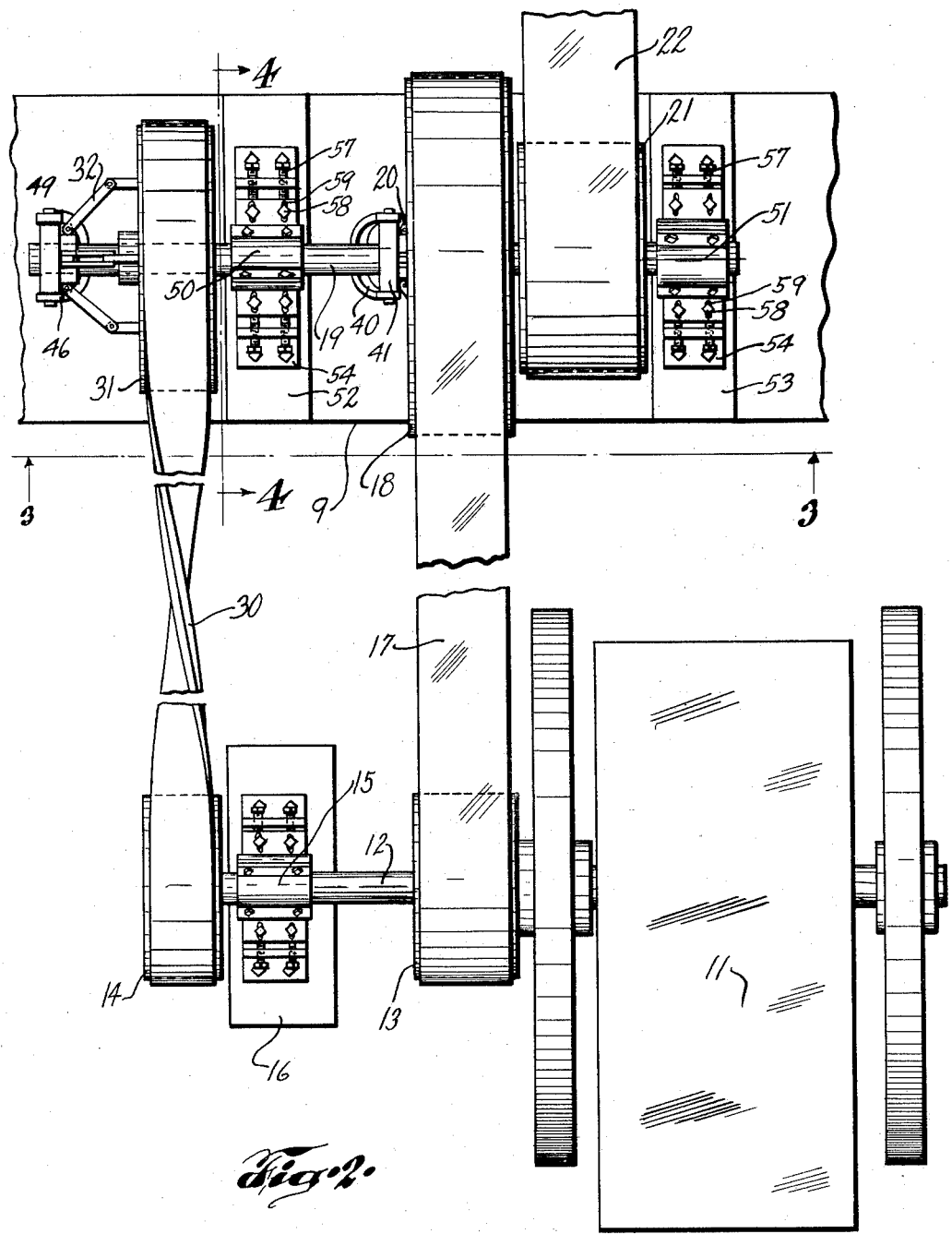
INVENTOR.
HARRY J. RENKEN
BY
ATTORNEY.

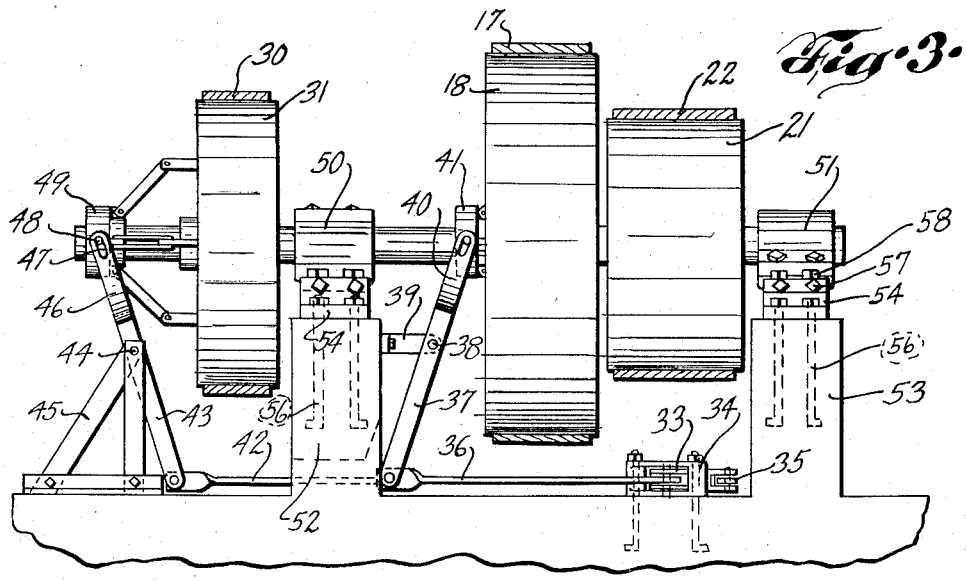

Patented Apr. 3, 1934

1,953,132

UNITED STATES PATENT OFFICE 1,953,132

POWER TRANSMISSION APPARATUS

Harry J. Renken, Evanston, Ill., assignor to Fairbanks, Morse & Co., Chicago, Ill., a corporation of Illinois Application January 20, 1932, Serial No. 587,729

5 Claims. (Cl. 74—21)

This invention relates to improvements in power transmission apparatus, and more particularly to power driven reversing countershaft assemblies, employed in connection with oil field power equipment.

In prior types of transmission equipment employed with oil well power rigs, it is usual to employ an engine or motor having a drive shaft extension, on which is secured a pair of pulleys, the shaft being supported by means of an outboard bearing. These pulleys are operatively connected, by means of belts, to corresponding pulleys mounted on a countershaft on which is secured a power take-off pulley connected, for example, to the band-wheel of the pump rig. In these older types of assemblies, it is usual to cross one of the belts between the prime mover and countershaft, to secure a reversal in direction of rotation of the countershaft. In these older types of reversing countershaft assemblies, the countershaft is supported by means of bearings arranged on the outer ends of the shaft, so that all the pulleys on the shaft are disposed between the bearing supports. It is common practice in this type of service to remove the cross belt during the pumping operation, when the power for pumping is being supplied through the straight belt drive. By the removal of the cross belt from the pulley, the ordinary belt losses caused by friction and the like, are eliminated. In these older types of assemblies, as above described, the removal of this cross belt from the pulley was rendered rather difficult, due to the location of the bearings on the outer ends of both the countershaft and engine shaft, making it practically impossible to store this crossed belt, in a position entirely clear of the shaft, after removal of the belt, without dismantling the bearings, or unlacing the belt. In oil field installations these difficulties are enhanced, by reason of the high belt tension usually employed as necessary for transmitting power for pumping, drilling and like purposes.

It is, therefore, an object of the present invention to provide an improved power transmission assembly for use with oil well power rigs, the assembly including a power drive shaft, a pair of pulleys secured to the shaft, belts running from the pulleys to corresponding pulleys on a countershaft, one of the belts being crossed to secure reversal in direction of rotation of the countershaft, the pulleys carrying the reversing belt being overhung outside of the bearing supports to facilitate ready and easy removal of this belt, during the time when the straight belt is in service.

A further object is to provide an improved reversing countershaft assembly, for use in connection with oil field production equipment, the assembly including reversing pulleys which are mounted entirely outside of, or beyond the bearings for both the countershaft and drive shaft, and means for adjustably shifting the countershaft bearings, in a direction, for controlling the tension of the cross-belt to permit easy removal and replacement thereof.

An additional object is to provide an improved countershaft assembly for use with oil well rigs, the assembly including a countershaft provided with adjacently disposed driven and driving pulleys, utilized for the normal operation of the apparatus, with bearings disposed as closely as possible to these pulleys; the shaft being extended outwardly beyond one bearing, for a reversely driven, outboard pulley. By this provision, the length of the shaft portion between bearings, for supporting the power driven and power take-off pulleys, is considerably less than in the case of previous countershaft assemblies for this purpose, thereby reducing the extent and range of shaft deflections caused by tight belts. This provision also enables the use of a lighter shaft, since the distance from any one pulley to the bearing, most remote therefrom, is considerably less than in heretofore prevailing apparatus.

Further objects and advantages will appear from the following detailed description of parts, and from the accompanying drawings, in which:

Fig. 1 is a diagrammatic elevation of a preferred form of oil well operating apparatus to which certain of the present improvements are applied; Fig. 2 is a plan view of a portion of the apparatus shown in Fig. 1; Fig. 3 is a side elevation of a portion of the device as viewed from line 3—3 in Fig. 2, and Fig. 4 is an enlarged sectional elevation taken along line 4—4 in Fig. 2.

Referring by numerals to the drawings, 9 designates, generally, a preferred form of power transmission apparatus which may be employed in connection with, or as part of an oil field power unit, associated, for example, with oil well production items, designated generally as 10. An internal combustion engine 11 or other suitable prime mover is, by preference, provided with a power shaft extension 12 on which is secured a pair of drive pulleys 13 and 14. The shaft 12 is suitably journaled in a bearing 15 which is, by preference, adjustably secured to a bearing support 16. This shaft bearing is, by preference, arranged substantially between the pulleys 13 and 14, so that the pulley 14 overhangs, and lies outside of, the bearing. The pulley 13 carries, preferably, a straight belt 17 for transmitting power to a companion pulley 18, mounted loosely on a countershaft 19. The pulley 18 is arranged to be, at times, operatively connected to the shaft 19 by means of a clutch 20 of any conventional type, such as a friction clutch, the details of which are unnecessary to be illustrated. When the clutch 20 is thrown to engaging position, the engine drives the countershaft in the forward direction of rotation, to transmit engine power to a power-take off pulley 21, which is secured, as by a suitable key, (not shown) to the shaft 19. The pulley 21 carries a belt 22, for transmitting power to a bandwheel or like pulley 23 which is operatively associated with a suitable shaft (not shown), coupled, by preference, to a speed-reducing unit 24. The speed-reducing unit is, by preference, operatively connected to a crank 25, connected to a walking beam 26 by means of a pitman 27. To the opposite end of the walking beam 26, there is hung the cable or pump rods usually employed in well drilling, pumping or like apparatus. The bandwheel shaft (not shown) is provided with a pulley (not shown) which is operatively connected to a hoist 28 by means of a belt 29, or the like. It will, of course, be understood that the present improvements may be employed in connection with well drilling or pumping rigs that employ bandwheel drives or speed-reducing units, and that any number of hoists or pumping units may be connected to the present arrangement without departing from the underlying principles thereof.

In certain well-pumping operations, it is desirable to reverse the direction of rotation of the countershaft 19. For securing such a reversal, a cross-belt 30 operatively connects the pulley 14 on the power shaft 12 to a corresponding pulley 31 which is mounted loosely, and in overhung relation, on the countershaft 19. The pulley 31 is arranged, by preference, to be, at times, operatively connected to the countershaft by means of a clutch 32 of any conventional type, but which, by preference, corresponds in type to the clutch 20, for a purpose hereinafter appearing.

As will hereinafter appear, when the clutch 20 is actuated to disengaging position, the clutch 32 is automatically actuated to engaging position, so that the countershaft is driven in a reverse direction of rotation by means of the pulley connection above described. This reverse direction of rotation of the countershaft is, in turn, transmitted to the power take-off pulley 21 for driving certain of the production apparatus for pulling tubes and like operations. The selective actuation of the clutches 20 and 32, is accomplished through actuation of a double arm rocker 33 pivoted intermediate its arm portions on a stationary support 34. Selective actuation of the rocker 33, is obtained by means of a manual control member 35, with which is associated a lever (not shown), disposed for convenient actuation by an operator. One arm of the rocker 33 is connected, as by means of a link 36, to one end of a lever 37 which is pivoted intermediate its ends on a pin 38, mounted on a stationary support 39. The other end of the lever 37 is provided with a forked portion 40, connected to opposite sides of a clutch-actuating collar 41 by means of suitable pin and slotted connections. Axial movement of collar 41 will serve, as appears, to actuate the clutch 20 between engaged and disengaged position.

The other arm of the rocker 33 is connected by means of a link 42 to one end of a lever 43, pivoted intermediate its ends on a pin 44, mounted on a stationary support 45. The opposite end of the lever 43 is provided with a forked portion 46 having slots 47 in engagement with pins 48 secured to opposite sides of a clutch actuating yoke 49, this yoke serving to actuate the clutch 32. It will be readily seen that actuation of the control lever 35, in one direction, will pivot the rocker 33 in a manner to actuate the attached links 36 and 42 to manipulate one of the clutches to engaging position, while, at the same time, actuating the other clutch to disengaging position. By this provision, a single control movement of the member 35 automatically and selectively connects one of the clutches 20 or 32 to the countershaft 19, for obtaining the desired direction of rotation depending upon the driving rotation selected for the particular drilling or pumping operation.

For the more usual and normal power requirements, power is supplied from the engine through the straight belt 17, and it is common practice to remove the cross-belt 30 during this service to prevent needless friction and wear. As providing for ease in removal of this cross-belt, the countershaft 19 is, by preference, journaled in a pair of adjustable bearings 50 and 51, which are carried, respectively, on mounting supports or pedestals 52 and 53. The bearing 51 is, by preference, disposed on the outer end of the shaft, and outside of and as close as practicable, to the pulley 21. It is desirable to form this bearing of the spherical-seat type, to permit pivotal movement of the bearing relative to the support 53, for a purpose hereinafter appearing. The bearing 50 is, by preference, located close to the inner side of the pulley 31, with the pulleys 18 and 21 arranged on the shaft 19 between bearings 50 and 51. The bearing 50 is, by preference, of the take-up type to permit adjustment movement of the bearing in a direction to control belt tension. This is accomplished through the agency of a plate 54, (Fig. 4) having flanged portions 55, and secured to the support 52 by means of anchor bolts 56. Adjusting movement of the bearing relative to the plate 54, is obtained by means of a plurality of jack screws 57, which threadedly engage the flanges 55, the inner ends of each screw being arranged to engage side portions of the bearing. The bearing is arranged to be secured in adjusted position by means of a plurality of hold-down screws 58, which extend through slots 59, formed in laterally extended portions of the bearing. As appears, upon backing out the hold-down screws 58, the opposite jack screws 57 may be actuated to effect a belt-loosening or belt-tightening adjustment of the bearing, hence of the shaft 19, the slots 59 permitting the bearing to be moved relative to the pedestal support and plate 54. Upon completion of the desired adjustment the screws 58 are again taken up to assist in maintaining the bearing in adjusted position. The bearing 51 may be similar, as to provisions for adjustment, to the bearing 50, the details of which were heretofore described. A further provision is however made, in the case of bearing 51, in that, as before noted, the bearing 51 is of the spherical seat type, so as to permit a limited swinging movement of the shaft 19, about an axis through the pedestal 53.

When the cross-belt 30 is to be removed, it is only necessary to loosen the hold-down screws extended through the slots of bearing 50, and to manipulate the jack screws 57 so as to move the bearing toward the power shaft 12. Such a movement of the shaft is made possible by reason of the spherical-seat type of bearing 51, which permits this bearing to pivot relative to the support 53. It will, of course, be understood that the same result may be obtained by adjusting the jack screws associated with the bearing 51, in which case the spherical seat feature of the latter bearing may be dispensed with. When the shaft 19 is moved toward the power shaft 12, it will be seen that the tension on the cross-belt 30 is sufficiently relieved, to facilitate easy and ready removal of the belt. After removal of the cross-belt, the countershaft 19 may be swung back to its running position by readjustment of the bearing 50 through the jack screws 57, and the bearing may be, again, secured in adjusted position by means of the hold-down screws 53. It will be readily seen that, due to the fact that the cross-belt pulleys 14 and 31 are mounted in outboard relation on the power shaft and countershaft, respectively, the cross-belt may be completely removed from the pulleys. With such an arrangement the heretofore prevailing necessity for dismantling the bearing or disconnecting the belt in order to remove the cross-belt, is entirely avoided. The outboard arrangement of pulleys further facilitates belt removal and application in that there is thus provided a relatively free or clear side of each pulley, for belt manipulating access thereto.

The improved location of the bearing supports for the countershaft 19, with the reverse pulley placed outside of the bearings, insures a shorter length of shaft between bearings than is possible with older prevailing countershaft assemblies. This reduction in length of shaft between bearings, reduces deflection of the shaft incident to extraordinary belt tension necessary because of extreme load requirements. It will be apparent that with the take-off pulley 21, which serves as the main bandwheel drive, fixedly secured to the countershaft 19, practically all bearing stresses and wear occur in the outside pedestal bearing 51. In order to facilitate mounting and alignment of the shaft 12 in the bearing support 15, this bearing may be formed of the take-up type as above described, and by proper adjustment the engine shaft extension may be readily and easily aligned, without the necessity for original niceties of alignment between the engine base and support 16.

It will, of course, be understood that the present detailed description of parts and the accompanying drawings, relate to only a single preferred executional embodiment of the invention, and that substantial changes may be made in the described arrangement and construction of parts, as well as in the intended use of the apparatus described, without departing from the spirit and full intended scope of the invention.

I claim:

1. Power transmission apparatus comprising a unitary reversing countershaft structure including a shaft, a pair of spaced pedestal-type bearings therefor, one disposed near one end of said shaft, and the other inwardly of the opposite shaft end, a power take-off pulley and a main driven pulley disposed between said bearings and in close proximity to each other, a second driven pulley adapted for reverse rotation and mounted in overhung relation on the free end of said shaft beyond both of said bearings, a pair of clutches on the countershaft, one for each of said driven pulleys, means for operating said clutches concurrently toward opposite clutch positions, and means for selectively shifting the position of said shaft bearings, in a direction crosswise of the shaft.

2. In combination in oil well drilling and pumping mechanism, a driven pulley for said mechanism, an engine provided with an extended shaft and a pair of driving pulleys, a bearing for the engine shaft, located between the pulleys thereon, whereby the outer pulley is mounted in overhung relation, a countershaft disposed between the engine and driven pulley, bearings for the countershaft, means associated with the bearings, permitting adjusting movement thereof in a direction to control the tension of belts operatively connected to the countershaft, a pair of pulleys disposed adjacently on the countershaft and between the countershaft bearings, a belt connecting one thereof to the said driven pulley, and a belt connecting the other thereof to one of the engine driving pulleys, a third pulley in overhung relation on the countershaft, disposed outwardly of any of the countershaft bearings, and belt connected for reverse rotation, to the overhung engine driving pulley, friction clutches associated with the engine driven pulleys of the countershaft and means for concurrently oppositely actuating said clutches.

3. A reversing power unit for oil well rigs and the like, including in combination with drilling and pumping mechanism and a driven pulley therefor, an engine provided with a shaft extension, a countershaft disposed between the engine and said mechanism, two driving pulleys in spaced relation on the engine shaft extension, a bearing between, and adjacent each of the driving pulleys, one of said pulleys being mounted in overhung relation on the said shaft extension, two driven pulleys loosely mounted on the countershaft, a power take-off pulley disposed adjacently to one of the engine driven pulleys on the countershaft, a pair of friction clutches on the countershaft, adapted for selectively connecting the said driven pulleys thereto, control means for concurrently actuating said clutches toward opposite clutching positions, a pair of bearings for the countershaft, disposed so as to provide a free shaft end carrying one of the engine driven countershaft pulleys in overhung relation, a reversing belt connecting the outer or overhung pulleys, a main drive belt connecting the inner pulleys, a belt from the power take-off pulley to the driven pulley of the said drilling and pumping mechanism, and means for separately shifting said bearings in a direction to control belt tension.

4. Power transmission apparatus comprising a unitary reversing countershaft structure including a shaft, a pair of spaced bearings therefor, one disposed near one end of said shaft, and the other inwardly of the opposite shaft end, a power take-off pulley and a main driven pulley disposed between said bearings and in close proximity to each other, a second driven pulley adapted for reverse rotation and mounted in overhung relation on the free end of said shaft beyond both of said bearings, means for selectively connecting the driven pulleys to the shaft, and means for selectively shifting the position of said shaft bearings, in a direction crosswise of the shaft.

5. Power transmission apparatus for belt drive assemblies, comprising a unitary reversing countershaft structure including a shaft, a pair of spaced pedestal-type bearings therefor, one disposed near one end of said shaft, and the other inwardly of the opposite shaft end, a unitary support common to said bearings, a power take-off pulley and a main driven pulley disposed in close proximity to each other between said bearings, a second driven pulley adapted for reverse rotation and mounted in overhung relation on the free end of said shaft beyond both of said bearings, a pair of clutches on the countershaft, one for each of said driven pulleys, a clutch-actuating rod connecting the two clutches, a lever connected to said rod, the rod and lever arranged for operating said clutches concurrently toward opposite clutch positions, and screws associated with each of said shaft bearings, arranged for selectively adjusting the position of said shaft bearings in a direction crosswise of the shaft, and adapted to retain the bearings in their adjusted positions.

HARRY J. RENKEN.